United States Patent
Gokhale et al.

(10) Patent No.: US 8,572,337 B1
(45) Date of Patent: Oct. 29, 2013

(54) SYSTEMS AND METHODS FOR PERFORMING LIVE BACKUPS

(75) Inventors: Aditya Gokhale, Maharashtra (IN); Trimbak Bardale, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 988 days.

(21) Appl. No.: 12/637,205

(22) Filed: Dec. 14, 2009

(51) Int. Cl.
*G06F 12/00* (2006.01)
*G06F 13/00* (2006.01)
*G06F 13/28* (2006.01)

(52) U.S. Cl.
USPC ............. 711/162; 711/111; 711/4; 707/639; 707/640; 707/999.204; 714/6.3; 714/15

(58) Field of Classification Search
USPC .......................................................... 711/162
See application file for complete search history.

(56) References Cited

U.S. PATENT DOCUMENTS

| | | | |
|---|---|---|---|
| 7,640,408 B1* | 12/2009 | Halligan et al. | 711/162 |
| 7,836,267 B1* | 11/2010 | Cross | 711/162 |
| 2003/0037211 A1* | 2/2003 | Winokur | 711/162 |
| 2003/0154464 A1* | 8/2003 | Ullmann et al. | 717/130 |
| 2005/0086652 A1* | 4/2005 | Tian et al. | 717/151 |
| 2005/0138308 A1* | 6/2005 | Morishita et al. | 711/162 |
| 2005/0262298 A1* | 11/2005 | Lubbers et al. | 711/112 |
| 2006/0143412 A1* | 6/2006 | Armangau | 711/162 |
| 2006/0277378 A1* | 12/2006 | Morishita et al. | 711/162 |
| 2007/0022263 A1* | 1/2007 | Fandel et al. | 711/162 |
| 2008/0140966 A1* | 6/2008 | Deguchi et al. | 711/162 |
| 2008/0209145 A1* | 8/2008 | Ranganathan et al. | 711/162 |

OTHER PUBLICATIONS

Neeta Garimella; Understanding and Exploiting Snapshot Tech mology for Data Protection, Part 1: Snapshot Technology Overview; IBM; Apr. 26, 2006.
Neeta Garimella; Understanding and exploiting snapshot technology for data protection, Part 1: Snapshot technology overview; http://www.ibm.com/developerworks/tivoli/library/t-snaptsm1/index.html, as accessed on Sep. 25, 2009.
Symantec Connect Community; BESR 7.0 Snapshot error 1450; http://www.symantec.com/connect/forums/besr-70-snapshot-error-1450, as accessed on Sep. 25, 2009.
Symantec Connect Community; Error EC8F17B7 and Snapshot error 1450; http://www.symantec.com/connect/forums/error-ec8f17b7-and-snapshot-error-1450, as accessed on Sep. 25, 2009.

* cited by examiner

*Primary Examiner* — Aimee Li
*Assistant Examiner* — Prasith Thammavong
(74) *Attorney, Agent, or Firm* — ALG Intellectual Property, LLC (57) ABSTRACT

A computer-implemented method for performing live backups may include identifying a request to perform a live backup on a volume of data. The computer-implemented method may also include creating a snapshot of the volume. The computer-implemented method may further include identifying each attempt to write to the volume during the live backup. The computer-implemented method may additionally include, for each write attempt, identifying a block of data that the write attempt will overwrite and copying the block of data to a backup queue before allowing the write attempt. Various other methods, systems, and computer-readable media are also disclosed.

20 Claims, 6 Drawing Sheets

SYSTEMS AND METHODS FOR PERFORMING LIVE BACKUPS

BACKGROUND

Organizations increasingly rely on computer data in a variety of contexts. Sometimes, organizations may want to perform a live backup (i.e., back up data that is currently in use and which may therefore change during a backup process). In order to maintain a consistent view of the data (e.g., to ensure that all data in a backup reflects a single moment in time), organizations may use a backup system that takes a snapshot of the data at a desired backup time.

Taking a snapshot of a large volume of data by making a copy of the entire volume may be very inefficient in terms of time and computing resources. To efficiently maintain a snapshot of a large volume of data, backup systems may use copy-on-write techniques, which make copies of blocks of data before the blocks are overwritten.

Although traditional copy-on-write techniques may form a more efficient basis for performing live backup than copying an entire volume of data, traditional techniques may still consume a significant amount of resources. For example, making a copy of each original block of data in the snapshot that is overwritten may interfere with the I/O performance of live applications. Furthermore, storing each copy made during the live backup may consume a significant amount of storage space on the volume. In some cases, the volume being backed up may even run out of space due to the copied blocks, leaving the backup system unable to continue maintaining the snapshot.

SUMMARY

As will be described in greater detail below, the instant disclosure generally relates to systems and methods for performing live backups. Embodiments of the instant disclosure may perform a live backup by copying original data blocks directly to a backup volume (e.g., to a backup queue in volatile memory) during copy-on-write operations rather than caching the original data blocks locally (e.g., in a volume being backed up). For example, a method may include identifying a request to perform a live backup on a volume of data, creating a snapshot of the volume, and identifying each attempt to write to the volume during the live backup. The method may also include, identifying, for each write attempt, a block of data that the write attempt will overwrite and copying the block of data to a backup queue before allowing the write attempt.

In some embodiments the method may also include, after identifying the block of data, determining that the block of data has not already been backed up. In some contexts, the live backup may be an incremental backup. In these contexts, the method may also include determining that the block of data has been modified since a prior backup.

The method may include copying the block of data to the backup queue in a variety of ways. For example, the method may include copying the block of data to the front of the backup queue. In some embodiments, the backup queue may reside outside the volume. In certain embodiments, the backup queue may reside in volatile memory and/or random access memory. In various embodiments, copying the block of data to the backup queue may entail copying the block of data directly to the backup queue instead of copying the block of data to the volume.

In some examples, the method may also include writing blocks of data in the backup queue to a backup volume. Writing blocks of data in the backup queue to a backup volume may include skipping blocks of data already written to the backup volume.

The method may additionally include pre-fetching blocks of data from the volume to the backup queue. Pre-fetching blocks of data from the volume to the backup queue may include skipping blocks of data already copied to the backup queue.

In some examples, a system for performing live backups may include an identification module, a snapshot module, an interception module, and a copy-on-write module. The identification module may be programmed to identify a request to perform a live backup on a volume of data. The snapshot module may be programmed to create a snapshot of the volume. The interception module may be programmed to identify each attempt to write to the volume during the live backup. The copy-on-write module may be programmed to identify, for each write attempt, a block of data that the write attempt will overwrite and to copy the block of data to a backup queue before allowing the write attempt.

The copy-on-write module may copy the block of data to the backup queue in a variety of ways. For example, the copy-on-write module may copy the block of data to the front of the backup queue. In some embodiments, the backup queue may reside outside the volume. In certain embodiments, the backup queue may reside in volatile memory and/or random access memory. In various embodiments, the copy-on-write module may copy the block of data to the backup queue by copying the block of data directly to the backup queue instead of copying the block of data to the volume.

In some examples, the copy-on-write module may also write blocks of data in the backup queue to a backup volume. In some examples, the copy-on-write module may skip blocks of data already written to the backup volume when writing blocks of data in the backup queue to the backup volume.

In some embodiments, a computer-readable-storage medium may include one or more computer-executable instructions that, when executed by at least one processor of a computing device, cause the computing device to identify a request to perform a live backup on a volume of data, create a snapshot of the volume, and identify each attempt to write to the volume during the live backup. The instructions may also cause the computing device to identify, for each write attempt, a block of data that the write attempt will overwrite and to copy the block of data to a backup queue before allowing the write attempt.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing live backups. Embodiments of the instant disclosure may efficiently and effectively perform a live backup on a volume of data by performing copy-on-write operations with minimal interference to the volume of data. By copying original versions of blocks of data to a backup queue rather than the volume being backed up, the volume of data may have more free space. In some cases, by avoiding storage consumption, embodiments of the instant disclosure may avoid backup errors or failures that may be caused when traditional copy-on-write operations have no free space in which to store copies of original blocks of data. Furthermore, embodiments of the instant disclosure may reduce interference with the I/O activity of live applications by not writing original blocks of data to the volume being backed up and subsequently reading copies of the original blocks of data from the volume.

Figure 1:
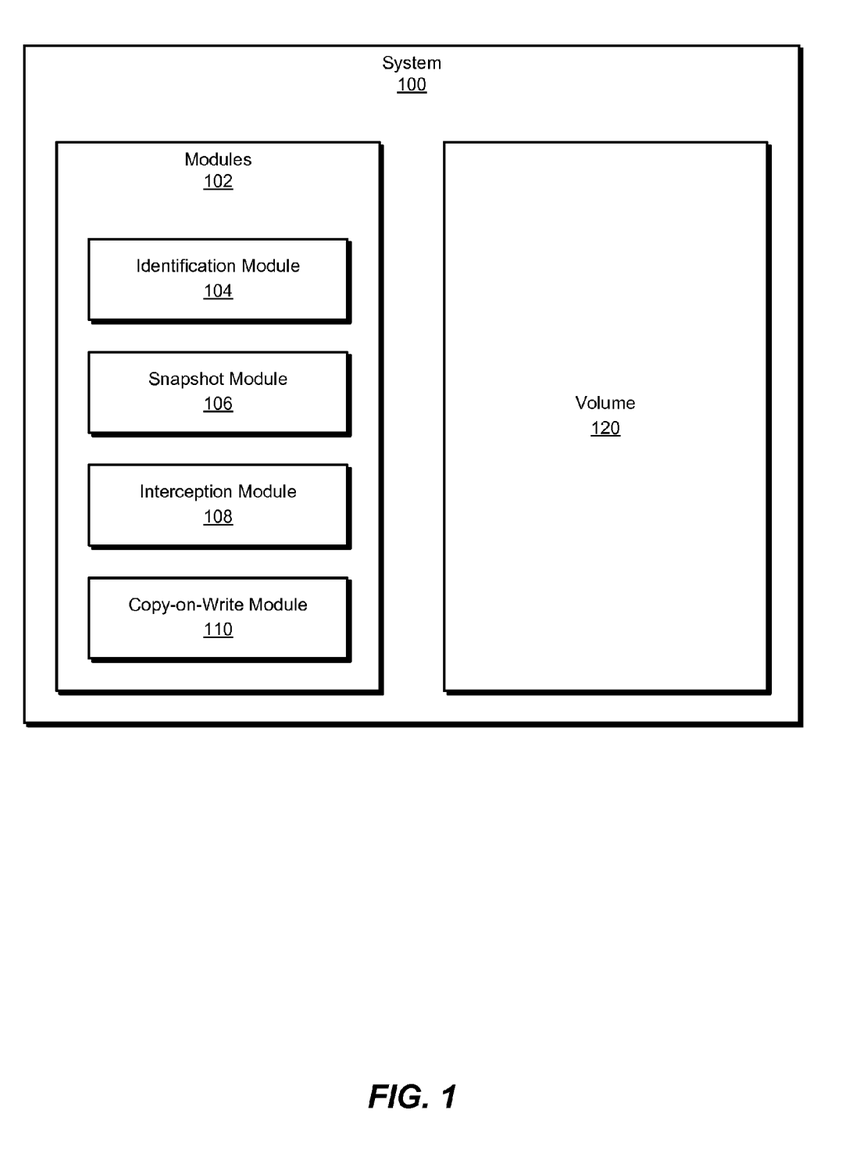
FIG. 1 is a block diagram of an exemplary system for performing live backups.
Figure 2:
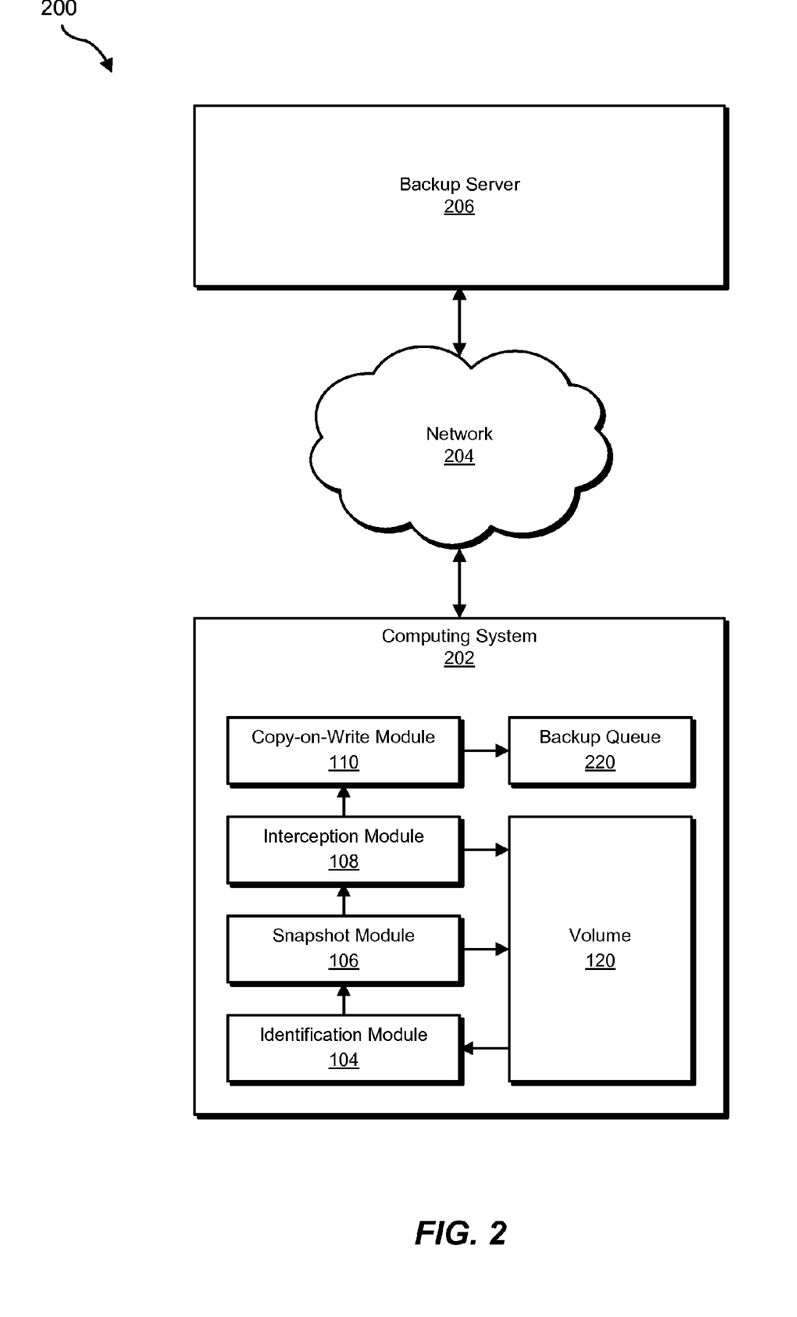
FIG. 2 is a block diagram of another exemplary system for performing live backups.

The following will provide, with reference to FIGS. 1-2, detailed descriptions of exemplary systems for performing live backups. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing live backups. As illustrated in this figure, exemplary system 100 may include one or more modules 102 for performing one or more tasks. For example, and as will be explained in greater detail below, exemplary system 100 may include an identification module 104 programmed to identify a request to perform a live backup on a volume of data. Exemplary system 100 may also include a snapshot module 106 programmed to create a snapshot of the volume. Exemplary system 100 may further include an interception module 108 programmed to identify each attempt to write to the volume during the live backup.

In addition, and as will be described in greater detail below, exemplary system 100 may include a copy-on-write module 110 programmed to identify, for each write attempt, a block of data that the write attempt will overwrite and further programmed to copy the block of data to a backup queue before allowing the write attempt. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or backup server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a volume 120. Volume 120 may represent portions of a single storage device or computing system or a plurality of storage devices or computing systems. For example, volume 120 may represent a portion of computing system 202 in FIG. 2, computing system 510 in FIG. 5, and/or portions of exemplary network architecture 600 in FIG. 6. Alternatively, volume 120 in FIG. 1 may represent one or more physically separate devices capable of being accessed by a computing device, such as computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202 in communication with a backup server 206 via a network 204. Computing system 202 may include volume 120 and a backup queue 220. In one embodiment, and as will be described in greater detail below, modules 102 from FIG. 1 may program computing system 202 to perform a live backup of volume 120 to backup server 206.

For example, identification module 104 may identify a request to perform a live backup of volume 120. Snapshot module 106 may then create a snapshot of volume 120. During the live backup, interception module 108 may identify each attempt to write to volume 120. For each write attempt, copy-on-write module 110 may identify a block of data within volume 120 that the write attempt will overwrite. Copy-on-write module 110 may then copy the block of data to a backup queue (e.g., a pre-fetch queue for copying data blocks to backup server 206) before allowing the write attempt.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backup server 206 generally represents any type or form of computing device that is capable of providing backup services and/or storage space for a backup. Examples of backup server 206 include, without limitation, servers configured with backup software, servers configured to provide storage services, and storage devices.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and backup server 206.

Figure 3:
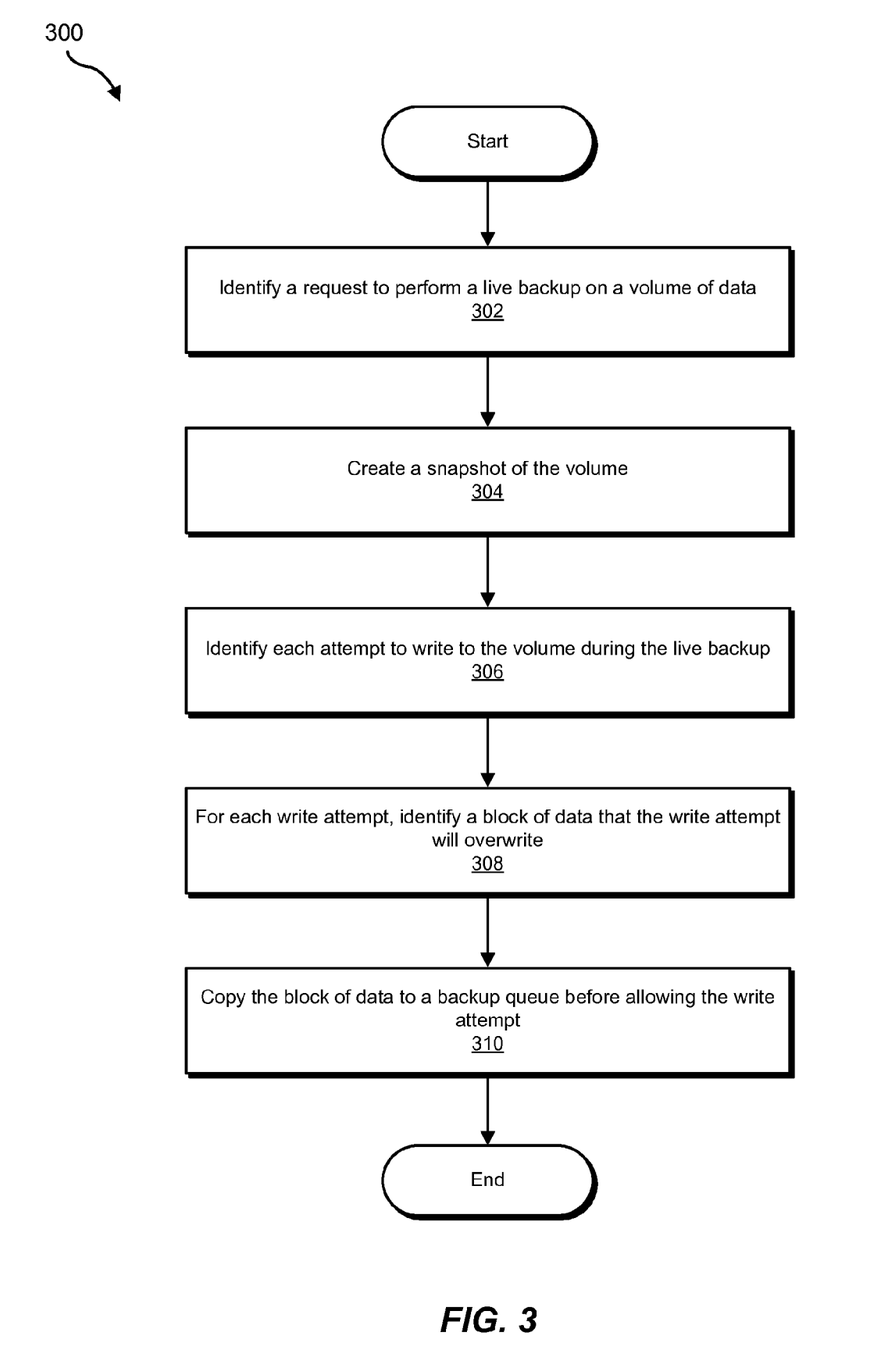
FIG. 3 is a flow diagram of an exemplary method for performing live backups.

FIG. 3 is a flow diagram of an exemplary computer-implemented method 300 for performing live backups. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request to perform a live backup on a volume of data. For example, at step 302 identification module 104 may, as part of computing system 202 in FIG. 2, identify a request to perform a live backup on volume 120.

As used herein, the phrase "live backup" may refer to any backup operation and/or process during which at least some of the source data for the backup may change. Accordingly, a "request to perform a live backup" may include any request, command, instruction, and/or communication that initiates or attempts to initiate a backup under circumstances in which at least some of the source data for the backup may change. As used herein, the term "volume" may refer to any volume, collection, and/or group of data which may undergo a live backup.

Identification module 104 may perform step 302 in any suitable manner. For example, identification module 104 may identify the request to perform a live backup on the volume of data in the course of receiving the request (e.g., as part of an inter-process communication). Additionally or alternatively, identification module 104 may intercept the request to perform the live backup. In some examples, identification module 104 may observe backup system operations and may infer the request to perform the live backup from its observations. In certain embodiments, identification module 104 may simply receive a communication identifying the volume of data and may treat the communication as a request to perform a live backup on the volume of data.

At step 304, one or more of the systems described herein may create a snapshot of the volume. For example, at step 304 snapshot module 106 may, as part of computing system 202 in FIG. 2, create a snapshot of volume 120. As used herein, the term "snapshot" may refer to any representation of a data volume in a certain state and/or point in time. In some embodiments, the content of the snapshot may be distributed across systems. For example, a snapshot of volume 120 may include blocks of data stored on volume 120 and copies of original blocks of data stored on backup server 206. In some embodiments, the snapshot may not explicitly reference every block of data that it conceptually includes. For example, the snapshot may reference only blocks of data stored on volume 120 and not blocks of data copied to backup server 206.

Snapshot module 106 may perform step 304 in any suitable manner. For example, snapshot module 106 may create the snapshot of the volume by creating a reference map to each block of data in the volume indicating whether the block of data has been changed since the time of the snapshot.

At step 306 one or more of the systems described herein may identify each attempt to write to the volume during the live backup. For example, at step 306 interception module 108 may, as part of computing system 202 in FIG. 2, identify each attempt to write to volume 120 during the live backup (e.g., after the snapshot is created and before the volume has been entirely backed up to backup server 206).

Interception module 108 may identify each attempt to write to the volume during the live backup in any suitable manner. For example, interception module 108 may include portions of a file system driver (e.g., a file system filter driver). In this example, interception module 108 may receive and identify each attempt to write to a file and/or to a data block in the volume. Additionally or alternatively, interception module 108 may communicate with a file system driver and/or intercept write attempts by a file system driver to write to a file system. Interception module 108 may further be configured to operate only during a live backup (e.g., interception module 108 may load once the snapshot is created and unload once the live backup is complete).

To illustrate some of the examples described above, FIG. 4 shows an exemplary system 400 for performing live backups. In this illustration, volume 120 may include blocks 410-440. A file system driver 402 may (at different times) make write attempts 450, 452, 454, and 456 to blocks 432, 416, 428, and 438, respectively. Interception module 108 (which may include portions of a file system driver) may receive each of write attempts 450-456 before they reach volume 120. Interception module 108 may then pass each of these write attempts on to copy-on-write module 110 for further action.

Returning to FIG. 3, at step 308 one or more of the systems described herein may identify, for each write attempt, a block of data that the write attempt will overwrite. For example, at step 308 copy-on-write module 110 may (as part of computing system 202 in FIG. 2), for each write attempt to volume 120, identify a block of data in volume 120 that the write attempt will overwrite. As used herein, the phrase "block of data" may refer to any block, segment, region, or other unit of data, whether fixed or irregular, of any suitable size and any suitable format.

Copy-on-write module 110 may perform step 308 in any suitable manner. For example, copy-on-write module 110 may receive information from interception module 108 identifying a block of data that a write attempt will overwrite.

In various embodiments, copy-on-write module 110 may also verify that the block of data may require a copy-on-write operation. For example, copy-on-write module 110 may determine that the block of data has not already been backed up. Copy-on-write module 110 may determine that the block of data has not already been backed up in a variety of ways. For example, copy-on-write module 110 may query a backup system to determine whether the block of data has been backed up. Additionally or alternatively, copy-on-write module 110 may inspect a map that is updated when a block of data is backed up to see if the block of data is indicated as being backed up in the map.

In some contexts, the live backup may be an incremental backup. In these contexts, copy-on-write module 110 may verify that the block of data requires a copy-on-write operation by determining that the block of data has been modified since a prior backup (e.g., since the last incremental backup or since a full backup if there have been no intervening incremental backups).

As will be explained in greater detail below, blocks of data that may require a copy-on-write operation may be copied to a backup queue. In some examples, copy-on-write module 110 may verify that the block of data requires a copy-on-write operation by determining that the block of data is not already in the backup queue.

At step 310 one or more of the systems described herein may copy, for each write attempt, the block of data to a backup queue before allowing the write attempt. For example, at step 310 copy-on-write module 110 may (as part of computing system 202 in FIG. 2), for each write attempt to volume 120, copy the block of data targeted by the write attempt to backup queue 220 before allowing the write attempt.

As used herein, the phrase "backup queue" may refer to any suitable data structure (e.g., a queue, a stack, and/or a linked list) and/or subsystem for holding, storing, and/or transmitting data to a backup. For example, as will be described in greater detail below, the backup queue may include a queue for blocks of data pre-fetched by a backup system. In some embodiments, the backup queue may include portions of one or more network layers and/or storage mechanisms configured to transmit data to a backup volume (e.g., copy-on-write module 110 may copy a block of data to the backup queue by transmitting the block of data directly to a backup volume).

Copy-on-write module 110 may perform step 310 in a variety of ways. For example, copy-on-write module 110 may copy the block of data to the front of the backup queue. In various embodiments, copying the block of data to the front of the backup queue may entail copying the block of data to the head of the backup queue or near the head of the backup queue. If the backup queue is implemented as a stack, copying the block of data to the front of the backup queue may include copying the block of data to the end (e.g., first-read position) of the stack. Generally, copying the block of data to the front of the backup queue may include any copying operation that places the block of data in a position of priority for processing.

In some examples, copy-on-write module 110 may copy the block of data directly to the backup queue instead of copying the block of data to the volume. The backup queue may reside in any suitable location. For example, the backup queue may reside outside the volume (e.g., on another volume). In some examples, the backup queue may reside in volatile memory and/or random access memory.

In some embodiments, one or more systems described herein may also pre-fetch blocks of data from the volume to the backup queue. For example, a backup system may be configured to sequentially back up each block of data in the volume. The backup system may, accordingly, pre-fetch the blocks of the data volume to the backup queue in sequence. In some embodiments, the backup system may be configured to skip blocks of data already copied to the backup queue. For example, the backup system may be configured to check if a block of data is already in the backup queue before pre-fetching the block. Additionally or alternatively, the backup system may be configured to check if the block of data was previously in the backup queue and has already been backed up.

Figure 4:
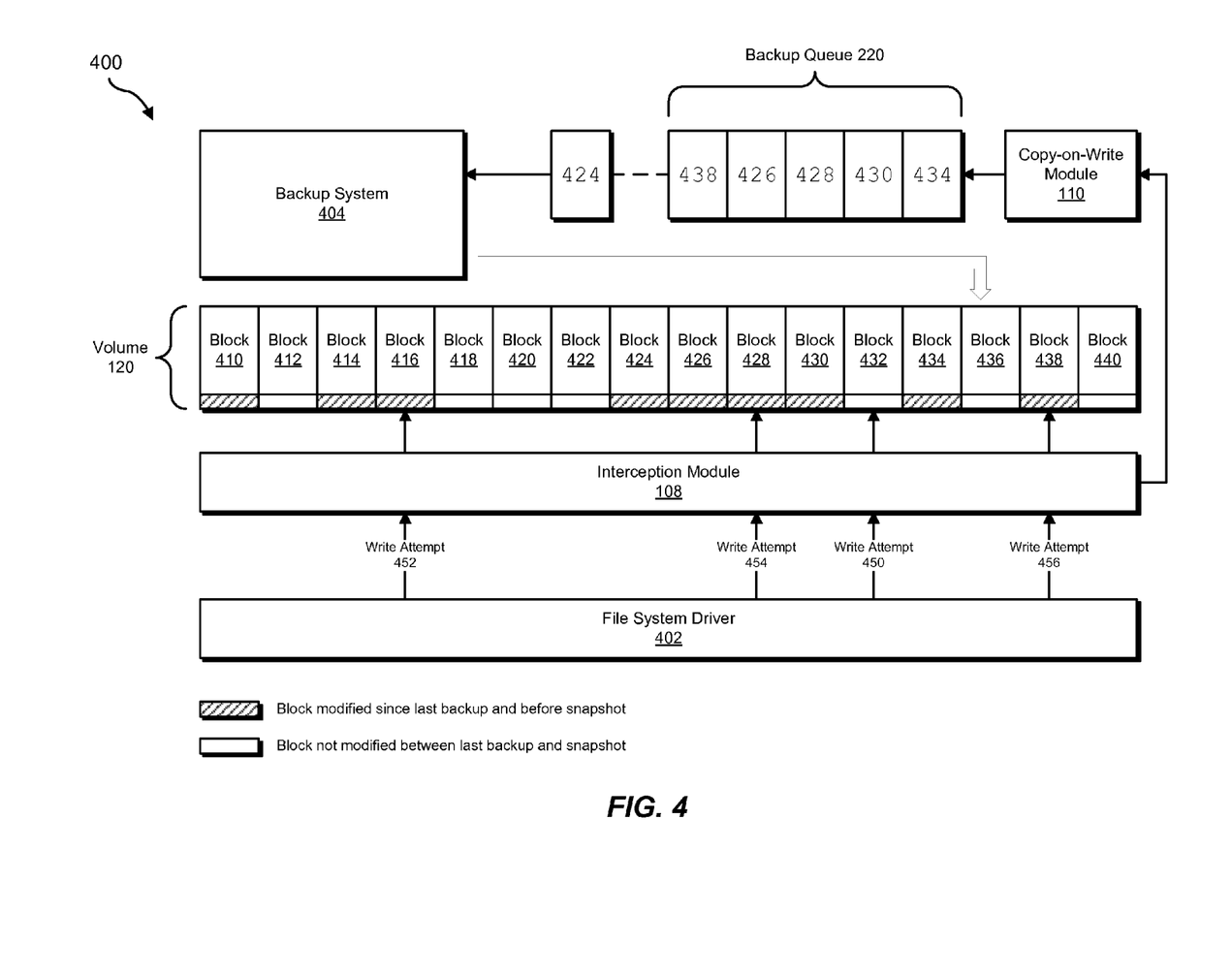
FIG. 4 is a block diagram of an exemplary system for performing live backups.

Using FIG. 4 as an illustration of some of the examples described above, exemplary system 400 may include a backup system 404. Backup system 404 may be configured to sequentially back up the blocks in volume 120. To accomplish this, backup system 404 may pre-fetch blocks from volume 120 to backup queue 220. Backup system 404 may backup the blocks in their order on backup queue 220. Copy-on-write module 110 may also write to the queue. As illustrated in FIG. 4, backup system 404 may be in the process of backing up block 424 from backup queue 220, and may be ready to enqueue block 436.

According to the state of the live backup as illustrated in FIG. 4, blocks 410-422 may already be backed up. Block 424 may be in the process of being backed up, and blocks 438, 426, 428, 430, and 434 may be queued to be backed up. Block 436 may be the next block due sequentially to be put on the queue by backup system 404. Block 432 may be absent from the queue in the current state for a number of reasons. In one example, block 432 may be absent from the queue because it was already put on the queue and backed up after interception module 108 intercepted write attempt 450. Alternatively, block 432 may be absent from the queue because the live backup is an incremental backup, and block 432 has not been modified since the last backup.

After intercepting write attempt 450, interception module 108 may intercept write attempt 452. However, copy-on-write module 110 may not copy block 416 to backup queue 220 because backup system 404 already backed up block 416 in the sequential backup process. After intercepting write attempt 452, interception module 108 may intercept write attempt 454. However, copy-on-write module 110 may not copy block 428 to backup queue 220 because block 428 is already in backup queue 220 due to sequential pre-fetching by backup system 404. After intercepting write attempt 454, interception module 108 may intercept write attempt 456. Copy-on-write module 110 may then copy block 438 to the front of backup queue 220.

In some embodiments, systems described herein may write blocks of data in the backup queue to a backup volume. For example, copy-on-write module 110 may write blocks of data in backup queue 220 to a backup volume on backup server 206.

Copy-on-write module 110 may write blocks of data in the backup queue to a backup volume in any suitable manner. In some examples, copy-on-write module 110 may skip blocks of data already written to the backup volume. For example, if a backup system pre-fetches blocks of data to the backup queue without regard to whether the blocks of data have already been backed up, copy-on-write module 110 may determine whether each block of data from the queue has already been backed up.

Copy-on-write module 110 may write blocks of data in the backup queue to the backup volume in a variety of contexts. For example, the backup volume may include a target backup file for the live backup. In some contexts, the backup file may allow blocks of data to be written in an arbitrary order. For example, the backup file may include a RAW sparse file or a virtual hard drive file (VHD). In other contexts, the format of the backup file may not support out-of-order writing (e.g., a V2I file). In these contexts, copy-on-write module 110 may write out-of-order blocks in the backup volume but outside the backup file (e.g., in a temp file), until the backup file is ready for each out-of-order block.

In one example, copy-on-write module 110 may write blocks of data in the backup queue to the backup volume by first determining if the backup queue is empty. If the backup queue is empty, copy-on-write module 110 may fetch a block identified as the "current block" from the volume. If the backup queue is not empty, copy-on-write module 110 may fetch the first block from the queue. Copy-on-write module 110 may then set the "current block" as the next block in the queue. Copy-on-write module 110 may then write the block that it fetched to the backup and mark the block as processed, after which copy-on-write module 110 may return to determining whether the queue is empty.

In an example of determining whether a block may require a copy-on-write operation, copy-on-write module 110 may first identify a block that is going to be written to the volume. If the block comes before a block currently being backed up, then interception module 108 may write the block to the volume. Otherwise, if the block has already been backed up, then interception module 108 may write the block to the volume. Otherwise, if the block has not been modified since a prior backup and the current backup is incremental, then interception module 108 may write the block to the volume. Otherwise, if the block is already in a backup queue, then interception module 108 may write the block to the volume. Otherwise, copy-on-write module 110 may first copy the block to the backup queue and then allow interception module 108 to write the block to the volume.

Figure 5:
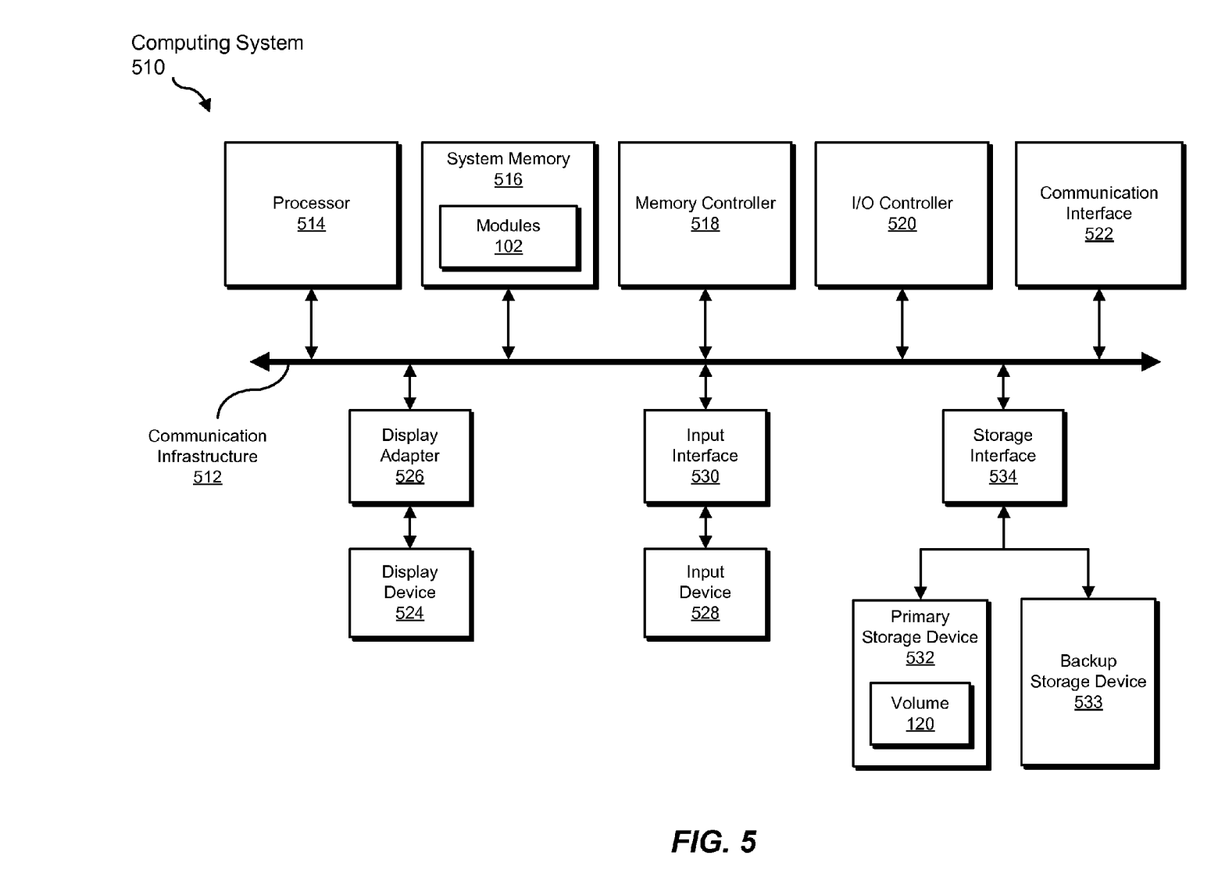
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, creating, determining, copying, skipping, pre-fetching, and/or writing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, creating, determining, copying, skipping, pre-fetching, and/or writing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, creating, determining, copying, skipping, pre-fetching, and/or writing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, creating, determining, copying, skipping, pre-fetching, and/or writing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, creating, determining, copying, skipping, pre-fetching, and/or writing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, volume 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, creating, determining, copying, skipping, pre-fetching, and/or writing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
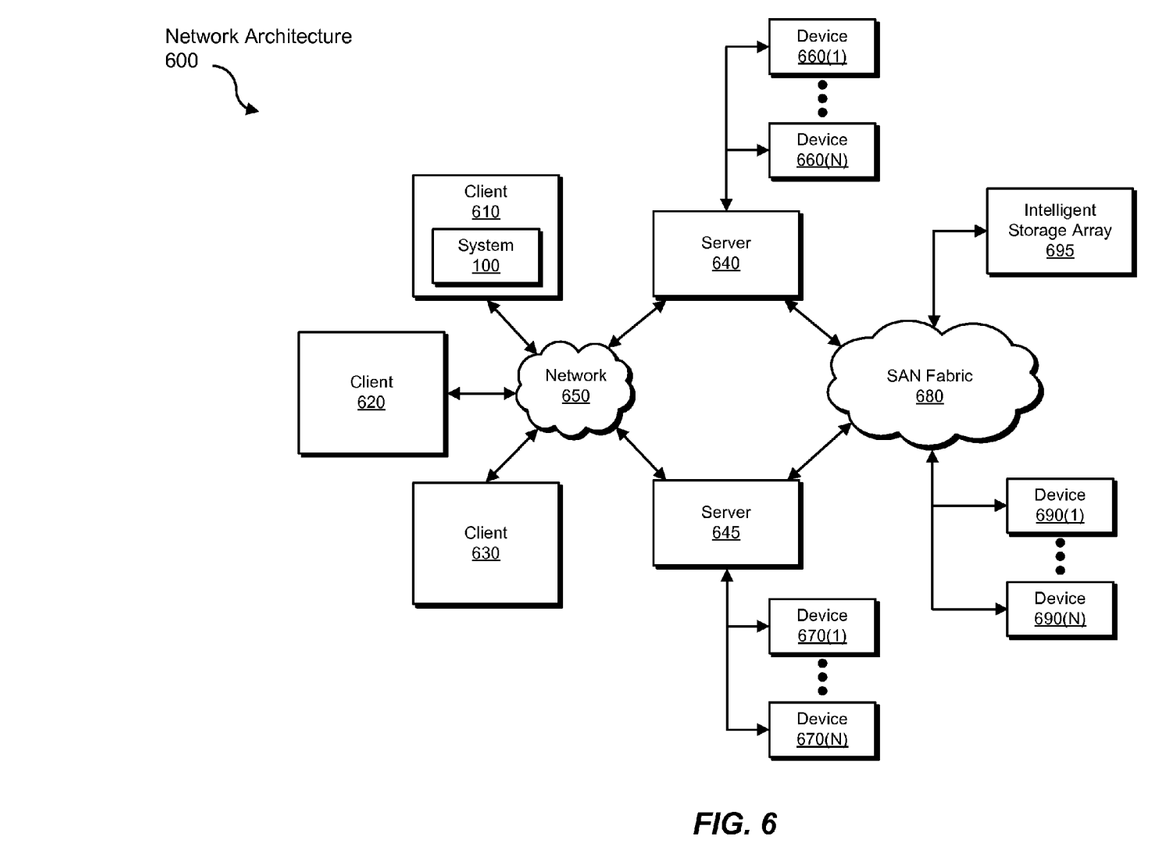
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, creating, determining, copying, skipping, pre-fetching, and/or writing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for performing live backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into an efficient system for performing live backups. As another example, one or more of the modules described herein may transform a volume of data into a backup of the volume of data.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing live backups, at least a portion of the method being performed by a computing device comprising at least one processor, the method comprising:
    identifying a request to perform a live backup on a volume of data to a backup file on a backup volume, wherein the backup file does not support out-of-order writing;
    creating a snapshot of the volume;
    identifying each attempt to write to the volume during the live backup;
    for each write attempt:
        identifying a block of data that the write attempt will overwrite;
        copying the block of data to a backup queue before allowing the write attempt;
    for each block of data in the backup queue, writing the block of data to the backup volume, wherein out-of-order blocks are written to the backup volume and stored in a temporary file on the backup volume until the backup file is ready for each of the out-of-order blocks.

2. The computer-implemented method of claim 1, wherein creating a snapshot of the volume comprises creating a reference map to each block of data in the volume indicating whether the block of data has been changed since the time of the snapshot.

3. The computer-implemented method of claim 1, wherein copying the block of data to the backup queue comprises copying the block of data to a backup queue that resides outside the volume.

4. The computer-implemented method of claim 1, wherein copying the block of data to the backup queue comprises copying the block of data to a backup queue in at least one of:
- volatile memory;
- random access memory.

5. The computer-implemented method of claim 1, wherein identifying a request to perform a live backup comprises inferring the request based on an identification of at least one backup system operation.

6. The computer-implemented method of claim 1, wherein identifying a request to perform a live backup comprises receiving a communication identifying the volume of data.

7. The computer-implemented method of claim 1, wherein writing the blocks of data in the backup queue to a backup volume comprises skipping blocks of data already written to the backup volume.

8. The computer-implemented method of claim 1, further comprising, for each write attempt, determining that the block of data has not already been backed up.

9. The computer-implemented method of claim 1, wherein the live backup comprises an incremental backup.

10. The computer-implemented method of claim 9, further comprising, for each write attempt, determining that the block of data has been modified since a prior backup.

11. The computer-implemented method of claim 1, further comprising pre-fetching blocks of data from the volume to the backup queue.

12. The computer-implemented method of claim 11, wherein pre-fetching blocks of data from the volume to the backup queue comprises skipping blocks of data already copied to the backup queue.

13. A system for performing live backups, the system comprising:
- an identification module programmed to identify a request to perform a live backup on a volume of data to a backup file on a backup volume, wherein the backup file does not support out-of-order writing;
- a snapshot module programmed to create a snapshot of the volume;
- an interception module programmed to identify each attempt to write to the volume during the live backup;
- a copy-on-write module programmed to:
  for each write attempt,
    identify a block of data that the write attempt will overwrite;
    copy the block of data to a backup queue before allowing the write attempt;
  for each block of data in the backup queue, write the block of data to the backup volume, wherein out-of-order blocks are written to the backup volume and stored in a temporary file on the backup volume until the backup file is ready for each of the out-of-order blocks;
- at least one processor configured to execute the identification module, the snapshot module, the interception module, and the copy-on-write module.

14. The system of claim 13, wherein the snapshot module is programmed to copy create a snapshot of the volume by creating a reference map to each block of data in the volume indicating whether the block of data has been changed since the time of the snapshot.

15. The system of claim 13, wherein the copy-on-write module is programmed to copy the block of data to the backup queue by copying the block of data to a backup queue that resides outside the volume.

16. The system of claim 13, wherein the copy-on-write module is programmed to copy the block of data to the backup queue by copying the block of data to a backup queue in at least one of:
- volatile memory;
- random access memory.

17. The system of claim 13, wherein the identification module is programmed to identify the request to perform a live backup by inferring the request based on an identification of at least one backup system operation.

18. The system of claim 13, wherein the identification module is programmed to identify the request to perform a live backup by receiving a communication identifying the volume of data.

19. The system of claim 13, wherein the copy-on-write module is programmed to write the blocks of data in the backup queue to a backup volume by skipping blocks of data already written to the backup volume.

20. A non-transitory computer-readable-storage medium comprising one or more computer-executable instructions that, when executed by at least one processor of a computing device, cause the computing device to:
- identify a request to perform a live backup on a volume of data to a backup file on a backup volume, wherein the backup file does not support out-of-order writing;
- create a snapshot of the volume;
- identify each attempt to write to the volume during the live backup;
- for each write attempt:
  identify a block of data that the write attempt will overwrite;
  copy the block of data to a backup queue before allowing the write attempt;
- for each block of data in the backup queue, write the block of data to the backup volume, wherein out-of-order blocks are written to the backup volume and stored in a temporary file on the backup volume until the backup file is ready for each of the out-of-order blocks.

* * * * *

UNITED STATES PATENT AND TRADEMARK OFFICE
CERTIFICATE OF CORRECTION

PATENT NO. : 8,572,337 B1  
APPLICATION NO. : 12/637205  
DATED : October 29, 2013  
INVENTOR(S) : Aditya Gokhale and Trimbak Bardale Page 1 of 1

It is certified that error appears in the above-identified patent and that said Letters Patent is hereby corrected as shown below:

In the Claims

Claim 14, at column 16, lines 7 to 11, should read:

The system of claim 13, wherein the snapshot module is programmed to create a snapshot of the volume by creating a reference map to each block of data in the volume indicating whether the block of data has been changed since the time of the snapshot.

Signed and Sealed this
Eighteenth Day of March, 2014

Michelle K. Lee
*Deputy Director of the United States Patent and Trademark Office*